(12) United States Patent
Bailey et al.

(10) Patent No.: US 10,512,362 B2
(45) Date of Patent: Dec. 24, 2019

(54) FRYING METHOD AND APPARATUS

(71) Applicant: Frito-Lay Trading Company GmbH, Berne (CH)

(72) Inventors: Richard Andrew Bailey, Leicestershire (GB); Simon John Lawton, Leicestershire (GB); Paul David Worth, Leicester (GB)

(73) Assignee: FRITO-LAY TRADING COMPANY GMBH (CH)

( * ) Notice: Subject to any disclaimer, the term of this patent is extended or adjusted under 35 U.S.C. 154(b) by 210 days.

(21) Appl. No.: 15/840,804

(22) Filed: Dec. 13, 2017

(65) Prior Publication Data

US 2018/0160852 A1  Jun. 14, 2018

(30) Foreign Application Priority Data

Dec. 14, 2016 (GB) .................................. 1621269.8

(51) Int. Cl.
*A47J 37/12* (2006.01)
*A23L 5/10* (2016.01)
*A23L 19/18* (2016.01)

(52) U.S. Cl.
CPC .............. *A47J 37/1214* (2013.01); *A23L 5/11* (2016.08); *A23L 19/18* (2016.08); *A47J 37/1223* (2013.01); *A47J 37/1233* (2013.01); *A47J 37/1266* (2013.01); *A23V 2002/00* (2013.01)

(58) Field of Classification Search
CPC ................ A47J 37/1214; A47J 37/1223; A47J 37/1266; A23L 5/11; A23V 2002/00
See application file for complete search history.

(56) References Cited

U.S. PATENT DOCUMENTS

| 2,994,613 | A | * | 8/1961 | Strehlow ................. A47J 43/24 426/441 |
| 3,826,184 | A | * | 7/1974 | Shotton, Jr. ......... A47J 37/1214 99/404 |
| 4,867,049 | A | | 9/1989 | Johnson |
| 6,929,812 | B2 | | 8/2005 | Van Der Doe |
| 2013/0022719 | A1 | | 1/2013 | Barber et al. |
| 2013/0149425 | A1 | | 6/2013 | Caridis et al. |

FOREIGN PATENT DOCUMENTS

| GB | 2170396 A | 8/1986 |
| WO | 01/91580 A1 | 12/2001 |

* cited by examiner

*Primary Examiner* — Steven N Leff
(74) *Attorney, Agent, or Firm* — Colin P. Cahoon; Shaukat A. Karjeker; Carstens & Cahoon, LLP

(57) ABSTRACT

An apparatus for frying snack foods, the apparatus including a fryer having a tubular frying section with inlet and outlet ends, the outlet end downstream relative to the inlet end. An oil supply system for supplying oil to the inlet end. A food input at the inlet end adapted to introduce pre-fried snack food pieces into a flow of oil at the inlet end. A food output at, or downstream of, the outlet end adapted to separate fried snack food pieces from the flow of oil. An oil flow accelerator accelerating oil flow from the inlet end to the outlet end thereby conveying the snack food pieces, immersed in the oil, from the inlet end to the outlet end during a frying process. Also disclosed is a method of frying snack foods.

47 Claims, 2 Drawing Sheets

FRYING METHOD AND APPARATUS

CROSS-REFERENCE TO RELATED APPLICATION

This application claims priority to GB Application No. 1621269.8 filed Dec. 14, 2016, the disclosures of which are incorporated herein by reference.

TECHNICAL FIELD

The present invention relates to a frying method and a frying apparatus and in particular to such a method and apparatus which have low capital and operating costs, high energy efficiency, and low waste heat.

DESCRIPTION OF RELATED ART

The present invention has particular application in the manufacture of snack foods, more particularly potato chips, produced by frying potato slices, or snack chips, produced by frying pellets.

Frying processes are commonly used to produce a variety of different fried foodstuffs. Frying is particularly used to cook snack food products such as potato chips and expanded snack chips produced from pellets. In potato chip and snack chip manufacture, pre-fried snack food precursor pieces, for example potato slices or dried pellets, are fried in a fryer containing cooking oil at an elevated temperature. Some snack food products ae made by batch frying, in which a defined amount of the snack food product is fried as a batch. Other snack food products are made by continuous frying, in which pre-fried snack food precursor pieces are continuously fed into an input end of a continuous fryer and the fried snack food chips are continuously outputted at an output end of the fryer. Known commercial continuous fryers are open tank fryer or vacuum fryers which incorporate mechanical components which push the food pieces along the fryer.

Large industrial continuous fryers that are commercially used for snack food manufacture comprise a large open tank containing heated cooking oil, an input mechanism at the input end, an output mechanism at the output end, and a conveying mechanism, typically a helical screw or a paddle system, within the tank. Energy is required to heat the oil and maintain it at the desired cooking temperature. In addition, the frying process dehydrates the pre-fried snack food precursor pieces and a volume of steam is generated which is typically captured by a hood disposed over the fryer and exhausted to the atmosphere, or the steam is passed into a thermal oxidiser for volatile destruction.

Such industrial continuous fryers have a large number of moving parts, for example for inputting, outputting and conveying the foodstuff, and for heating, cleaning and circulating the cooking oil. This results in high capital, installation and operating costs for such a fryer. When the continuous fryer is being commissioned, either from new or after a given service interval, and when being periodically subjected to ongoing maintenance, the various mechanical parts, for example paddles, belts, etc., require a time consuming mechanical set up, and periodic mechanical surveys and audits are required. The mechanical parts require comprehensive sanitisation, which is time consuming and costly.

These continuous fryers can exhibit the problem of product inconsistency. For any given product to be fried, there can be uncontrolled variations in the cooking conditions over the course of a cooking period. Also, the hot oil in the tank is exposed to oxygen in the atmosphere, which can oxidise the oil and lead to poor product quality. Furthermore, due to the length, width and depth of the tank, it may be difficult to control the required temperature profile during the cooking/frying process, which may reduce product quality. In some continuous fryers there can be a problem of hot oil being static within a region within the tank where, or oil can build up on hard surfaces, and this can result in oil overheating which may cause oil polymerisation, which reduces oil and product quality.

Furthermore, these continuous fryers are typically used to manufacture different snack food products in sequential different production runs. For example, a fryer may be used in one production period to produce an expanded snack food from pellets and in a subsequent production period to produce a different snack food, such as potato chips from potato slices. It can be difficult, and is time consuming, accurately to set a continuous fryer for such different production runs.

There is a generally recognised desire in the snack food manufacturing art to reduce manufacturing costs of the fried product. However, it is also necessary to ensure that the frying process and apparatus still produce a high quality product to the consumer which meets customer acceptance and is reliably and consistently achievable despite high production volumes. In particular, snack food chips, particularly potato chips are normally required to meet very strict customer acceptance criteria for the respective product, for example having specific moisture and oil-in-chip contents, and the desired taste, organoleptic and other sensory attributes.

SUMMARY OF THE INVENTION

The present invention aims to provide a method and apparatus for frying snack foods, most particularly snack food chips produced from pellets or potato chips, which can at least partially overcome the problems of continuous fryers discussed above.

The present invention accordingly provides an apparatus for frying snack foods, the apparatus comprising a fryer comprising a tubular frying section having inlet and outlet ends, the outlet end being in a downstream direction relative to the inlet end, an oil supply system for supplying oil to the inlet end, a food input at the inlet end, the food input being adapted to introduce pre-fried snack food pieces into a flow of oil at the inlet end, and a food output at, or downstream of, the outlet end, the food output being adapted to separate fried snack food pieces from the flow of oil, and an oil flow accelerator mechanism for accelerating oil flow from the inlet end to the outlet end in the downstream direction thereby conveying the snack food pieces, immersed in the oil, from the inlet end to the outlet end during a frying process within the tubular frying section.

The present invention further provides a method of frying snack foods, the method comprising the steps of:

(a) providing a fryer comprising a tubular frying section having inlet and outlet ends, the outlet end being in a downstream direction relative to the inlet end;

(b) supplying oil to the inlet end;

(c) introducing pre-fried snack food pieces into a flow of oil at the inlet end;

(d) accelerating the flow of oil from the inlet end to the outlet end in the downstream direction thereby conveying the snack food pieces, immersed in the oil, as a flow of oil and snack food pieces from the inlet end to the outlet end during a frying process within the tubular frying section;

(e) frying the pre-fried snack food pieces in the tubular frying section to produce fried snack food pieces; and (f) at, or downstream of, the outlet end, separating the fried snack food pieces from the flow of oil at a food output.

Preferred features are defined in the dependent claims.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
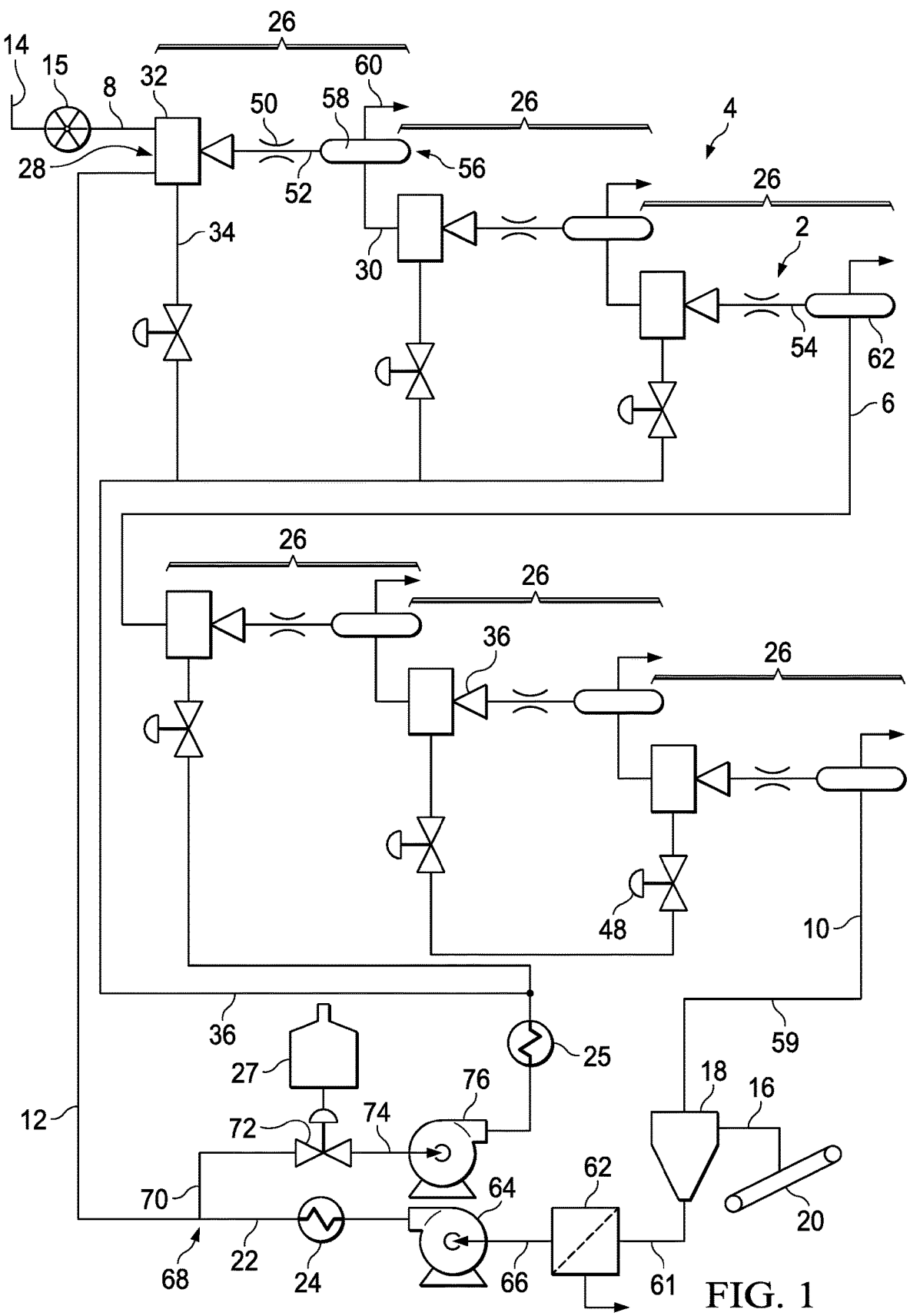
FIG. 1 is a schematic illustration of a frying apparatus in accordance with an embodiment of the present invention.
Figure 2:
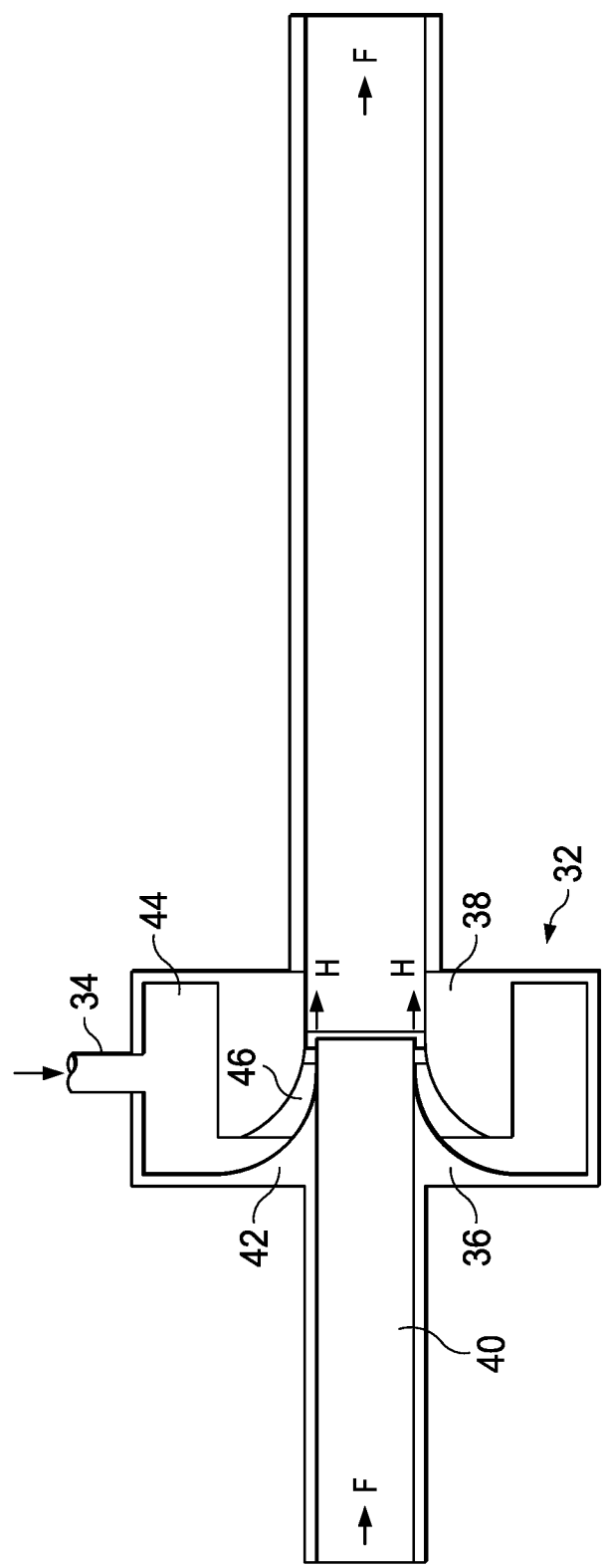
FIG. 2 is a detailed illustration of a venturi accelerator used in the frying apparatus of FIG. 1.

Referring to FIGS. 1 and 2, there is shown an apparatus 2 for frying snack foods in accordance with a first embodiment of the present invention. The apparatus 2 comprises a fryer 4 comprising a tubular frying section 6 having inlet and outlet ends 8, 10. The outlet end 10 is in a downstream direction relative to the inlet end 8. An oil supply system 12 supplies oil to the inlet end 8.

The tubular frying section 6 is in the form of a pipe system which can have any suitable cross-sectional shape and dimensions, which may vary along the length of the tubular frying section 6, to provide an enclosed conduit which conveys oil and product to be fried in the oil from the inlet end 8 to the outlet end 10. The cross-section of the tubular frying section 6 may be circular or any other shape, and may be cylindrical or conical, and may be concentric or non-concentric. The fryer 4 seals oil within the fryer 4 and oil is conveyed around a loop including the tubular frying section 6.

A food input 14 is provided at the inlet end 8. The food input 14 is adapted to introduce pre-fried snack food pieces into a flow of oil at the inlet end 8. In the illustrated embodiment, the food input 14 comprises a rotary valve 15 adapted to introduce a continuous supply of solid pre-fried snack food pieces into the flow of oil at the inlet end 8.

A food output 16 is at, or downstream of, the outlet end 10. The food output 16 is adapted to separate fried snack food pieces from the flow of oil. In the illustrated embodiment, the food output 16 comprises a centrifugal separator 18 which is adapted to deposit onto a conveyor 20 a continuous supply of fried snack food pieces.

A primary oil recirculating system 22 recirculates oil from the outlet end 10 to the inlet end 8. A heat exchanger 24 heats the oil in the primary oil recirculating system 22.

The tubular frying section 6 is configured to define a plurality of frying zones 26 serially arranged between the inlet and outlet ends 8, 10. In the illustrated embodiment there are six frying zones 26, although any other desired number may be provided. Each frying zone 26 comprises an input side 28 and an output side 30. Each frying zone 26 also comprises a respective oil flow accelerator mechanism 32. However, in an alternative embodiment there is only a single frying zone 26, and a single oil flow accelerator mechanism 32. The one or more frying zones 26 provide a desired temperature profile along the tubular frying section 6.

Each oil flow accelerator mechanism 32 functions to accelerate oil flow from the inlet end 8 to the outlet end 10 in the downstream direction thereby conveying the snack food pieces, immersed in the oil, from the inlet end 8 to the outlet end 10 during a frying process within the tubular frying section 6.

Each oil flow accelerator mechanism 32 is adapted to provide a hydrodynamic oil flow from the inlet end 8 to the outlet end which hydrodynamic oil flow provides the sole conveying force acting on the snack food pieces conveyed from the inlet end 8 to the outlet end 10 during the frying process within the tubular frying section 6.

In the preferred embodiment, the tubular frying section 6 has no moving parts between the inlet and outlet ends 8, 10.

Each oil flow accelerator mechanism 32 comprises an oil injection port 34, for injecting a secondary oil flow into a primary oil flow in the tubular frying section 6, which primary oil flow is provided by the oil supply system 12 at the inlet end 8.

The oil for the secondary oil flow is provided by a secondary oil recirculating system 36 for recirculating oil from the outlet end 10 of the tubular frying section 6 to the or each oil flow accelerator mechanism 32. A heat exchanger 25 heats the oil in the secondary oil recirculating system 36. An oil tank 27 is coupled to the secondary oil recirculating system 36 to provide an oil top-up to the secondary oil recirculation, and thus to the entire oil supply for the frying apparatus 2.

Referring to FIG. 2, the oil flow accelerator mechanism 32 comprises a venturi flow accelerator 36 coupled to the oil injection port 34, for increasing a velocity of the secondary oil flow and thereby accelerating the primary oil flow. The venturi flow accelerator 36 comprises an annular body 38 defining a central channel 40 for a central flow through the venturi flow accelerator 36, the central flow being part of the primary oil flow. An input port 42 is coupled to the oil injection port 34. A chamber 44 is coupled to the input port 42. A venturi constriction 46 couples the chamber 44 to the central channel 40 and injects the secondary oil flow into the primary oil flow in the tubular frying section 6. The venturi constriction 46 is annular and surrounds the central channel 40. The oil flow accelerator mechanism 32 further comprises a valve mechanism 48 on the oil injection port 34 for controlling the oil flow rate of the secondary oil flow.

The frying zone 26 further comprises a flow residence time control element 50 comprising a length 52 of the tubular frying section 6 which is downstream of the oil flow accelerator mechanism 32 and is configured to control the velocity of the flow of oil and snack food pieces therethrough. In one embodiment, a cross-sectional area of a channel 54 for the flow of oil and snack food pieces through the length 52 is larger than a cross-sectional area of the central channel 40 of the upstream oil flow accelerator mechanism 32, which can slow down the flow rate and increase the residence time in the zone 26. Additionally, or alternatively, the cross-sectional area of the channel 54 may be progressively tapered so as to reduce in dimensions in the downstream direction.

The frying zone 26 further comprises a gas vent mechanism 56 coupled to the tubular frying section 6 between the respective input and output sides 28, 30. The gas vent mechanism 56 comprises a phase separation chamber 58 for separating a gas phase from the flow of oil and snack food pieces and an outlet conduit 60 extending from an upper part 62 of the phase separation chamber 58. The gas vent mechanism 56 is in a downstream direction relative to the oil flow accelerator mechanism 32 and the flow residence time control element 50 of the respective frying zone 26. A gas pressure control valve is provided at the outlet conduit 60.

The gas pressure control valve can be preset to a release pressure value so that the gas is vented when the pressure within the phase separation chamber 58 reaches a preset value. This pressure pre-setting further enables the cooking time/temperature profile to be controlled in the zone 26, and can enable the pressure drop across individual zones 26 to be individually controlled.

Each frying zone 26 comprises a respective assembly of a respective oil flow accelerator mechanism 32, a respective flow residence time control element 50 which is downstream of the respective oil flow accelerator mechanism 32, and a respective gas vent mechanism 56 downstream of the respective flow residence time control element 50.

The primary oil recirculating system 22 recirculates oil from the outlet end 10 to the inlet end 8 and includes a return conduit 59 from the last frying zone 26. The return conduit 59 feeds the flow of oil and fried snack food pieces to the centrifugal separator 18. The oil output 61 of the centrifugal separator 18 is connected to a filter mechanism 62 which filters food particles from the returned oil. The solid material is periodically removed from the filter mechanism 62. The oil is conveyed along a return conduit 66 to a pump 64 and then the heat exchanger 24. At a conduit connection 68 the return conduit 66 continues back to the inlet 8, to complete the primary oil recirculating system 22, and a side conduit 70 connects to the secondary oil recirculating system 36. The side conduit 70 connects as an input to a three-way valve 72 which has an input conduit from the oil tank 24 and an output conduit to a pump 76 and to the heat exchanger 25 which heats the oil in the secondary oil recirculating system 36. The output conduit 74 connects, for example by a manifold, to the plurality of input ports, each for a respective oil flow accelerator mechanism 32.

In use, the apparatus 2 is used in a method of frying snack foods. Oil is supplied to the inlet end 8 as a continuous flow. The oil flow has been pressurised by the pump 64 and preheated by the heat exchanger 24. The oil input temperature is typically from 175 to 205° C. The oil input pressure is typically from 0.10 to 0.15 MPa.

The method produces snack food from pre-fried pieces such as potato slices or pellets, which are conventional in the art. Although the pieces inputted into the fryer 4 are described as being pre-fried, they may have been subjected to some precooking or other preconditioning prior to being fried in the fryer 4, for example in the form of pellets which have been formed by extrusion in which the composition of the pellet have been cooked during the extrusion process. Alternatively, the pre-fried pieces may be raw, for example in the form of potato slices. Consequently, the term "pre-fried" as used herein is to be interpreted broadly as meaning that the composition of the pieces that are fried may already be have been cooked, or may be raw.

The pre-fried snack food pieces are continuously introduced into the flow of oil at the inlet end 8 by the rotary valve 14. A primary oil flow is supplied at the inlet end 8 and a secondary oil flow is injected into the primary oil flow in the tubular frying section 6 to accelerate the primary oil flow in the downstream direction. Downstream of the outlet end 10 the fried snack food pieces are separated from the flow of oil using the centrifugal separator 18 which deposits onto the conveyor 20 a continuous supply of fried snack food pieces. At the outlet end 10 or the centrifugal separator 18 the oil is typically at a temperature of from 150 to 180° C.

The tubular frying section 6 defines a plurality of frying zones 26 serially arranged between the inlet and outlet ends 8, 10. Although only one frying zone 26 may be provided, the advantage of providing a plurality of frying zones 26 is that a series of oil accelerations can be provided along the length of the fryer 4. Also, the temperature and residence time within each zone 26 can be readily controlled to provide an individual time/temperature profile for each zone 26, and an individual time/temperature profile for the entire fryer 4. The temperature of each zone 26 is controlled by the heat loss and the heat input. The heat loss is affected by the removal of gas, steam and other volatiles (as well, of course, by thermal losses from the fryer 4). The heat input is affected by the temperature of the input primary oil flow as well as the temperature of the secondary oil flow. The secondary oil flow can be heated to a temperature so that the injected secondary oil not only accelerates the primary oil flow but also heats the primary oil flow. By controlling the temperatures of the primary oil flow and the secondary oil flow, and controlling the residence time in each zone 26, the individual time/temperature profile for each zone 26, and an individual time/temperature profile for the entire fryer 4, can be readily controlled.

At each oil flow accelerator mechanism 32, high velocity heated oil is injected, as indicated by the arrows H in FIG. 2, into the central primary oil flow F, which accelerates the flow of oil from the inlet end 8 to the outlet end 10 in the downstream direction. This acceleration provides that the snack food pieces, immersed in the oil, can be conveyed as a flow of oil and snack food pieces from the inlet end 8 to the outlet end 10 during a frying process within the tubular frying section 6.

The injected oil temperature is typically from 180 to 205° C. The injected oil pressure is typically from 0.10 to 0.15 MPa.

Typically, the injected oil comprises from 1 to 5 wt % of the total oil passing through the tubular frying section 6 comprising the fryer 4.

A venturi flow acceleration increases a velocity of the secondary oil flow and thereby accelerates the primary oil flow. The injected oil, using a venturi accelerator, accelerates the flow, which compensate for frictional effects in the tubular frying section 6 which would otherwise slow the flow and require the provision of mechanically moving parts, such as paddles or a screw mechanism, between the inlet and outlet ends 8, 10 of the fryer 4. The oil flow accelerator mechanism(s) 32 between the inlet and outlet ends 8, 10 provide a hydrodynamic oil flow from the inlet end 8 to the outlet end 10 which provides the sole conveying force acting on the snack food pieces conveyed from the inlet end 8 to the outlet end 10 during the frying process within the tubular frying section 6. The tubular frying section 6 has no moving parts between the inlet and outlet ends 8, 10.

The pre-fried snack food pieces are fried in the tubular frying section 6 to produce fried snack food pieces. At, or downstream of, the outlet end 10, the fried snack food pieces are centrifugally separated from the flow of oil at the food output 14. The output temperature of the fried snack food pieces may be sufficiently high to provide high oil drainage from the fried snack food pieces immediately after removal from the oil in the centrifugal separator 18 and on the conveyor 20. The increased drainage in turn can causes reduced oil content in the final snack food products.

Thereafter the fried snack food pieces are then topically seasoned and packaged, using processes and apparatus conventional in the art.

The oil flow rate of the secondary oil flow is controlled using the valve mechanism 48. Downstream of the oil flow acceleration, the flow residence time is controlled by controlling the velocity of the flow of oil and snack food pieces.

The velocity control is achieved by flowing the flow of oil and snack food pieces through the enlarged cross-sectional area, or alternatively a progressively tapering portion, of the channel 54 for the flow of oil and snack food pieces.

The same fryer 4 can be employed to make different snack food products in different production runs. Each individual snack food product would require a specific individual time/temperature profile during the frying operation to optimise the properties of the resultant fried snack food. The apparatus of the invention can readily be controlled to provide such an individual time/temperature profile during the frying operation by controlling the temperatures of the primary oil flow and the secondary oil flow, the secondary oil flow rate for each zone 26 and the residence time in each zone 26.

Since the frying process dehydrates the pre-fried snack food pieces, thereby producing steam, and also tends to produce other volatile side-products, gas and other volatiles are vented from the tubular frying section 6 between the inlet and outlet ends 8, 10. A gas phase is separated from the flow of oil and snack food pieces in a respective phase separation chamber and then the gas phase is vented from that chamber at a respective outlet conduit extending from an upper part of the respective phase separation chamber. The step of venting gas is in a downstream direction relative to the respective oil flow acceleration and the step of controlling the flow residence time.

The steam is typically either exhausted to the atmosphere or fed into a thermal oxidiser for destruction of volatile material within the fryer vapours and then exhausted to the atmosphere. The gas may be subjected to a subsequent condensation step. The recovered condensate from the fryer vapours may be collected in a collection tank (not shown) which can then form a supply of water to be used elsewhere within the manufacturing plant or in the production process, for example for washing potatoes used to form the potato chips to offset or reduce fresh water consumption at the factory. The recovered water may be further cooled to ambient temperature using commercially available cooling equipment.

Compared to a conventional industrial scale commercial snack food fryer, the frying method and apparatus of the present invention can yield significant energy and cost savings. The provision of a tubular frying section, for example in the form of a pipe system, can provide not only improved energy efficiency but also an improved snack food product in that the snack food product can be consistently manufactured. The snack food may also exhibit a reduced oil content. Accordingly, the preferred embodiments of the present invention can provide a more nutritional product, without changing the taste or organoleptic or sensory qualities of the snack food product, particularly potato chips.

The oil flow, oil temperature and oil pressure can be controlled, in particular by using oil injection and steam removal, to achieve targeted pressure and temperature profiles during the frying product transformation. Each frying zone has a respective oil flow accelerator which injects secondary oil into the tubular frying section and the temperature and flow rate of the secondary oil are controlled to achieve a predetermined dehydration profile of the snack food pieces during the frying process within the respective frying zone.

The tubular frying section has low capital, installation and operating costs for compared to open tank commercial fryers. Since the fryer has a closed system, the oil is less exposed to oxidation and so has improved quality. The temperature profiles in the snack food can be reliably controlled, in particular to have a fast initial high temperature fry, when the product has a higher moisture content, and then a lower temperature finish, at lower moisture contents, thereby providing enhanced management of strategies to avoid acrylamide formation.

The tubular frying section can exhibit high product consistency and quality. The tubular frying section can readily be used to manufacture different snack food products in sequential different production runs, for example to produce an expanded snack food from pellets and in a subsequent production period to produce a different snack food, such as potato chips from potato slices. The tubular frying section can readily be set accurately and quickly for such different production runs without difficulty.

The tubular frying section can meet the need in the snack food manufacturing art to reduce manufacturing costs of the fried product, while still producing a high quality product to the consumer which meets customer acceptance and is reliably and consistently achievable despite high production volumes.

The tubular frying section can utilise higher oil temperatures to allow the snack food, such as potato chips, to be fried with the final snack food product having a reduced oil content, which can improve on the traditional properties of the potato chips without affecting their taste or organoleptic properties. The snack food products can also be controllably produced with acrylamide levels below industry acceptable standards for snack food, in particular potato chip, manufacture.

The invention claimed is:

1. An apparatus for frying snack foods, the apparatus comprising:
    a fryer comprising a tubular frying section having inlet and outlet ends, the outlet end downstream from the inlet end, wherein the tubular frying section is in the form of a pipe system providing an enclosed conduit which conveys oil and snack food to be fried in the oil from the inlet end to the outlet end, the fryer having no moving parts between the inlet and the outlet ends;
    an oil supply system for supplying oil to the inlet end, a food input at the inlet end, the food input introducing pre-fried snack food pieces into a flow of oil at the inlet end;
    a food output at, or downstream of, the outlet end, the food output being adapted to separate fried snack food pieces from the flow of oil;
    and an oil flow accelerator for accelerating oil flow from the inlet end to the outlet end thereby conveying the snack food pieces immersed in the oil, from the inlet end to the outlet end during a frying process within the tubular frying section;
    wherein the oil flow accelerator comprises:
    a central channel configured to transport oil flow therein;
    a chamber around the central channel, the chamber having an oil input port; and
    a secondary oil injection port from the chamber injecting secondary oil into the central channel to accelerate the oil flow in the central channel.

2. The apparatus according to claim 1, wherein the oil flow accelerator is adapted to provide a hydrodynamic oil flow from the inlet end to the outlet end, wherein the hydrodynamic oil flow provides the sole conveying force acting on the snack food pieces conveyed from the inlet end to the outlet end during the frying process within the tubular frying section.

3. The apparatus according to claim 1, wherein the oil flow accelerator further comprises a valve on the oil injection port for controlling the oil flow rate of the injected secondary oil.

4. The apparatus according to claim 1, further comprising a flow residence time control comprising a length of the tubular frying section, which is downstream of the oil flow accelerator, and is configured to control the velocity of the flow of oil and snack food pieces therethrough.

5. The apparatus according to claim 4, wherein a cross-sectional area of a channel for the flow of oil and snack food pieces through the length is larger than a cross-sectional area of the central channel of the upstream oil flow accelerator.

6. The apparatus according to claim 1, further comprising a gas vent coupled to the tubular frying section between the inlet and outlet ends.

7. The apparatus according to claim 6, wherein the gas vent comprises a phase separation chamber separating a gas phase from the flow of oil and snack food pieces and an outlet conduit extending from an upper part of the phase separation chamber.

8. The apparatus according to claim 6, wherein the gas vent is downstream of the oil flow accelerator.

9. The apparatus according to claim 8, wherein the gas vent is downstream of the flow residence time control element.

10. The apparatus according to claim 1, wherein the tubular frying section is configured to define a plurality of frying zones serially arranged between the inlet and outlet ends.

11. The apparatus according to claim 10, wherein each frying zone comprises an input side and an output side, and an oil flow accelerator.

12. The apparatus according to claim 11, wherein each frying zone further comprises a flow residence time control comprising a length of the tubular frying section which is downstream of the oil flow accelerator and is configured to control the velocity of the flow of oil and snack food pieces therethrough.

13. The apparatus according to claim 11, wherein each frying zone further comprises a gas vent coupled to the tubular frying section between the input and output sides.

14. The apparatus according to claim 13, wherein each gas vent comprises a phase separation chamber for separating a gas phase from the flow of oil and snack food pieces and an outlet conduit extending from an upper part of the phase separation chamber.

15. The apparatus according to claim 13, wherein the gas vent is downstream from the oil flow accelerator.

16. The apparatus according to claim 15, wherein the gas vent is downstream of the flow residence time control element.

17. The apparatus according to claim 10, wherein each frying zone comprises an assembly of an oil flow accelerator, a flow residence time control which is downstream of the oil flow accelerator, and a gas vent downstream of the flow residence time control.

18. The apparatus according to claim 1, further comprising a primary oil recirculating system for recirculating oil from the outlet end of the tubular frying section to the inlet end of the tubular frying section.

19. The apparatus according to claim 18, further comprising a secondary oil recirculating system for recirculating oil from the outlet end of the tubular frying section to the oil flow accelerator.

20. The apparatus according to claim 19, further comprising a heat exchanger for heating the oil in the secondary oil recirculating system.

21. The apparatus according to claim 19, further comprising an oil tank coupled to the secondary oil recirculating system.

22. The apparatus according to claim 1, wherein the food input comprises a rotary valve adapted to introduce a continuous supply of solid pre-fried snack food pieces into the flow of oil at the inlet end.

23. The apparatus according to claim 1, wherein the food output comprises a centrifugal separator.

24. The apparatus according to claim 23, wherein the centrifugal separator is adapted to deposit onto a conveyor a continuous supply of fried snack food pieces.

25. A method of frying snack foods, the method comprising the steps of:
(a) providing a fryer having no moving parts therein and comprising a tubular frying section having inlet and outlet ends, the outlet end downstream from the inlet end, wherein the tubular frying section is in the form of a pipe system and provides an enclosed conduit which conveys oil and snack food to be fried in the oil from the inlet end to the outlet end;
(b) supplying oil to the inlet end wherein step (b) provides a primary oil flow which is supplied at the inlet end;
(c) introducing pre-fried snack food pieces into a flow of oil at the inlet end;
(d) injecting secondary oil via a venturi flow accelerator into the primary oil flow to accelerate the flow of the combination of oil;
(e) frying the pre-fried snack food pieces in the tubular frying section to produce fried snack food pieces; and
(f) at, or downstream of, the outlet end, separating the fried snack food pieces from the flow of oil at a food output.

26. The method according to claim 25, wherein a hydrodynamic oil flow from the inlet end to the outlet end provides the sole conveying force acting on the snack food pieces conveyed from the inlet end to the outlet end during the frying process within the tubular frying section.

27. The method according to claim 25, wherein the venturi flow acceleration is provided by a venturi flow accelerator which comprises an annular body surrounding a central channel for a central flow through the venturi flow accelerator, the central flow being part of the primary oil flow, an input port coupled to the oil injection port, a chamber coupled to the input port and a venturi constriction, coupling the chamber to the central channel, for injecting the secondary oil flow into the primary oil flow in the tubular frying section.

28. The method according to claim 25, further comprising the step of controlling the oil flow rate of the secondary oil flow using a valve.

29. The method according to claim 25, further comprising the step of controlling a flow residence time downstream of the oil flow acceleration and controlling the velocity of the flow of oil and snack food pieces therethrough.

30. The method according to claim 29, wherein the velocity control is achieved by flowing the flow of oil and snack food pieces through an enlarged cross-sectional area of a channel for the flow of oil and snack food pieces.

31. The method according to claim 25, wherein the temperature and flow rate of the secondary oil are controlled to achieve a predetermined dehydration profile of the snack food pieces during the frying process within the tubular frying section.

32. The method according to claim 31, further comprising the step of venting gas from the tubular frying section between the inlet and outlet ends.

33. The method according to claim 32, wherein the step of venting gas further comprises separating a gas phase from the flow of oil and snack food pieces in a phase separation chamber and then venting the gas phase from that chamber at an outlet conduit extending from an upper part of the phase separation chamber.

34. The method according to claim 25, wherein the tubular frying section defines a plurality of frying zones serially arranged between the inlet and outlet ends.

35. The method according to claim 34, wherein each frying zone comprises an input side and an output side, and an oil flow acceleration step.

36. The method according to claim 35, wherein each frying zone further comprises the step of controlling the flow residence time downstream of the oil flow acceleration and is configured to control the velocity of the flow of oil and snack food pieces therethrough.

37. The method according to claim 36, wherein each frying zone further comprises gas venting from the tubular frying section between the input and output sides.

38. The method according to claim 37, wherein each step of venting gas further comprises separating a gas phase from the flow of oil and snack food pieces in the phase separation chamber and then venting the gas phase from that chamber at an outlet conduit extending from an upper part of the phase separation chamber.

39. The method according to claim 35, wherein each frying zone comprises an oil flow accelerator, a flow residence time control downstream from the oil flow accelerator, and a gas vent downstream from the flow residence time control.

40. The method according to claim 39, wherein each frying zone has an oil flow accelerator which injects secondary oil into the tubular frying section and the temperature and flow rate of the secondary oil are controlled to achieve a predetermined dehydration profile of the snack food pieces during the frying process within the frying zone.

41. The method according to claim 25, further comprising the step of recirculating the primary oil, from the outlet end of the tubular frying section to the inlet end of the tubular frying section.

42. The method according to claim 41, further comprising the step of recirculating oil, as a secondary oil recirculation, from the outlet end of the tubular frying section to an oil flow accelerator for accelerating oil in step (d).

43. The method according to claim 42, further comprising the step of heating the oil in the secondary oil recirculation using a heat exchanger.

44. The method according to claim 42, further comprising providing an oil top-up to the secondary oil recirculation from an oil tank.

45. The method according claim 25, wherein step (c) comprises introducing a continuous supply of solid pre-fried snack food pieces into the flow of oil at the inlet end using a rotary valve.

46. The method according to claim 25, wherein step (f) comprises separating the fried snack food pieces from the flow of oil using a centrifugal separator.

47. The method according to claim 46, wherein the centrifugal separator deposits onto a conveyor a continuous supply of fried snack food pieces.

\* \* \* \* \*